(12) United States Patent
Moschytz et al.

(10) Patent No.: US 6,208,732 B1
(45) Date of Patent: Mar. 27, 2001

(54) SWITCHED HYBRID CIRCUIT FOR USE WITH DIGITAL SUBSCRIBER LINES

(75) Inventors: George S. Moschytz, Zurich (CH); Arnold Muralt, Fair Haven, NJ (US)

(73) Assignee: Globespan Semiconductor, Inc., Red Bank, NJ (US)

( * ) Notice: Subject to any disclaimer, the term of this patent is extended or adjusted under 35 U.S.C. 154(b) by 0 days.

(21) Appl. No.: 09/022,564

(22) Filed: Feb. 12, 1998

(51) Int. Cl.[7] ............................................. H04B 1/58
(52) U.S. Cl. ................................. 379/402; 379/398
(58) Field of Search ................................ 379/402–405, 379/398–400, 340, 394

(56) References Cited

U.S. PATENT DOCUMENTS 4,757,530 * 7/1988 Arnon ................................. 379/403
5,175,763 * 12/1992 Gazsi ................................. 379/403

* cited by examiner

Primary Examiner—Wing F. Chan

(74) Attorney, Agent, or Firm—Thomas, Kayden, Horstemeyer & Risley

(57) ABSTRACT

The present invention provides a switched impedance matching network which may be implemented in a hybrid circuit of a digital subscriber line (DSL) system, or in any other wire-bound communications system for which two-wire-to-four-wire conversion, and vice versa, must be accomplished. In accordance with the preferred embodiment of the present invention, the matching network comprises switchable circuit modules of discrete-valued resistor and capacitor components. Preferably, the circuit modules are assembled into an array of buffered first-order RC circuits. The buffers comprise amplifiers that are switched on or off to control the switching of the circuit modules. The buffer amplifiers also isolate the individual circuit modules from each other and eliminate the need to implement transmission switches between the modules. The switching of the buffer amplifiers clears or blocks the transmission paths between the individual modules, thereby providing the optimum path through the module array. By controlling the transmission paths through the circuit module array, the balancing impedance of the matching network is optimized to match the impedance of the subscriber line in use, thus maximizing transhybrid loss and minimizing near-end echo.

24 Claims, 5 Drawing Sheets

SWITCHED HYBRID CIRCUIT FOR USE WITH DIGITAL SUBSCRIBER LINES

TECHNICAL FIELD OF THE INVENTION

The present invention relates to a hybrid circuit for performing two-wire-to-four-wire conversion, and vice versa. More particularly, the present invention relates to a hybrid circuit that employs an impedance matching network comprising circuit modules that can be switched on or off to produce a balancing impedance that matches the impedance of the subscriber loop. The hybrid circuit of the present invention can be used for all wire-bound communications systems for which a two-wire-to-four-wire conversion, or vice versa, must be carried out.

BACKGROUND OF THE INVENTION

Normally, hybrid circuits are comprised within data communications equipment (DCE) located at a central office. A four-wire circuit contained in the DCE connects the hybrid circuit to the receiver and transmitter of the DCE. A two-wire circuit, which corresponds to the subscriber loop, couples customer premises to the hybrid circuit at the central office. The hybrid circuit performs a conversion from the two-wire circuit to the four-wire circuit, and vice versa. The hybrid circuit provides the capability of full-duplex communication between the central office and the customer premises.

A typical hybrid circuit comprises a bridge circuit that is coupled to the two-wire circuit via a transformer. The bridge circuit comprises an impedance matching network for matching the impedance of the hybrid circuit with the impedance of the subscriber loop. Transhybrid loss, which corresponds to the portion of the signal transmitted by the transmitter of the DCE that is sent over the subscriber loop without being received by the receiver of the DCE, is controlled by matching the impedance of the impedance matching network of the bridge circuit with the impedance of the subscriber loop. Therefore, it is desirable to maximize the transhybrid loss, thus minimizing the amount of the transmitted signal which is reflected at the interface of the bridge circuit and the subscriber loop and received by the receiver of the DCE, which is commonly referred to as near-end echo.

In the past, attempts have been made to maximize the transhybrid loss by designing the impedance of the impedance matching network of the hybrid circuit so that it matches, as closely as possible, the impedance of the subscriber loop. However, once the impedance matching network was designed and implemented in the hybrid circuit, the impedance of the impedance matching network was fixed and could not be altered.

Accordingly, a need exists for a hybrid circuit having a variable impedance matching network that can be implemented in a practical manner and that is cost-effective.

SUMMARY OF THE INVENTION

The present invention provides a hybrid circuit having a switched impedance matching network. The hybrid circuit of the present invention performs two-wire-to-four-wire conversion, and vice versa, and can be used in any wire-bound communications system for which two-wire-to-four-wire conversion, and vice versa, must be performed. The hybrid circuit of the present invention can be implemented in a digital subscriber line (DSL) system and can be used with high-speed XDSL systems. In accordance with the preferred embodiment of the present invention, the matching network comprises switchable circuit modules of discrete-valued resistor and/or capacitor components. Preferably, the circuit modules are assembled into an array of buffer-isolated first-order RC circuits, although higher-order circuit modules may also be used. The buffers comprise amplifiers, which serve two purposes. A first purpose is to isolate the individual circuit modules from each other when they are connected in a cascade of circuit modules. A second purpose is to avoid having to implement actual transmission switches between the circuit modules.

The switching of the buffer amplifiers clears or blocks the transmission paths between the individual circuit modules, thereby providing the optimum path through the module array. By controlling the transmission paths through the module array, the balancing impedance of the matching network is optimized, thus maximizing transhybrid loss and minimizing near-end echo.

At least one circuit module of the array is switched on at any given time. Preferably, two or three of the circuit modules of the array are switched on at any given time to form a cascade of modules. The number of modules switched on at any given time in the array will depend on many factors, such as the impedance of the subscriber loop, as will be understood by those skilled in the art. Also, it is possible to obtain the desired balancing impedance by merely varying the gain of the switched-on circuit module(s). This feature of the present invention allows the power requirements of the array, and consequently, the power requirements of the overall hybrid circuit, to be minimized.

The optimum component settings for the circuit modules are determined through testing and will depend on the impedances of the subscriber loops with which the hybrid circuit is implemented. Once the component values for the circuit modules of the matching network have been selected, a learning phase begins during which different combinations of the circuit modules are connected for the different subscriber loops. During the learning phase, different combinations of circuit modules are switched on for each subscriber loop and the transhybrid power loss for each combination is measured. The combination of circuit modules resulting in the greatest maximization of transhybrid power loss is selected as the best combination for the particular subscriber loop. During operation, the appropriate combination of circuit modules for a particular subscriber loop are switched on to provide the hybrid circuit with a balancing impedance that substantially matches the impedance of the subscriber loop. Once a combination of circuit modules has been selected, the proper balancing impedance may be obtained by merely varying the gain of the array of circuit modules.

DETAILED DESCRIPTION OF THE DRAWINGS

Figure 1:
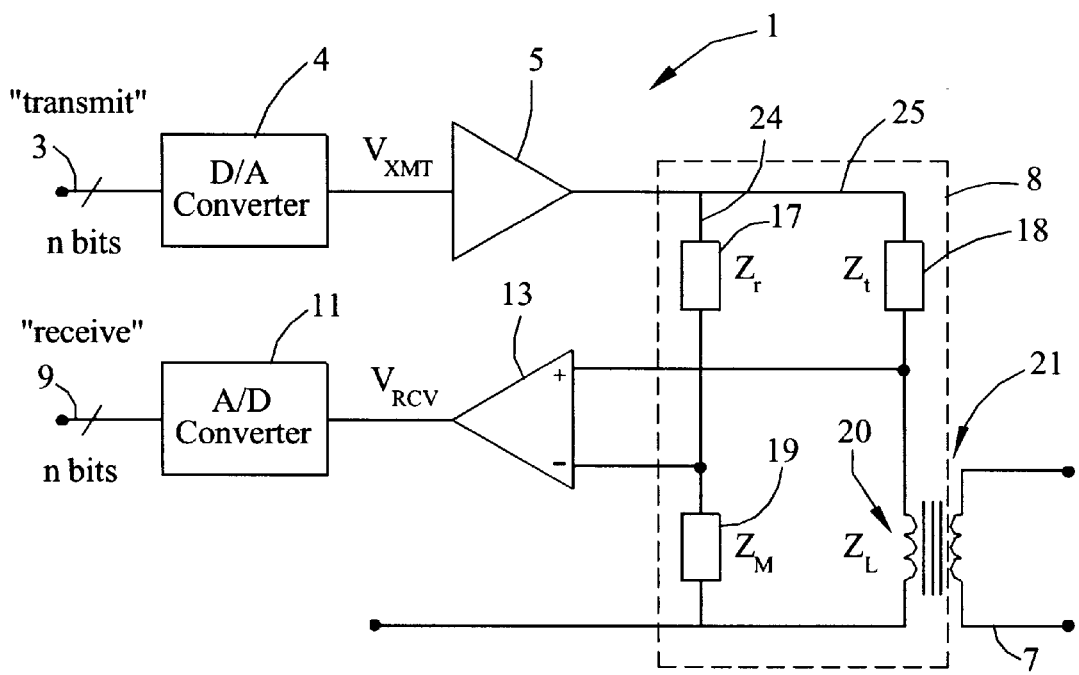
FIG. 1 is a block diagram of an active hybrid circuit 1 commonly employed at the central office for use in high-speed digital data communications, such as in various high-speed xDSL systems.

FIG. 1 is a block diagram of an active hybrid circuit 1 commonly used in high-speed digital data communications, such as in various high-speed xDSL systems. The hybrid circuit I comprises a transmit line 3 that is coupled to a digital-to-analog converter (DAC) 4. The DAC 4 is coupled to the input of a line driver amplifier 5 that amplifies the signal to be transmitted over the subscriber loop 7. The output of the line driver amplifier 5 is coupled to the bridge circuit 8. The receive line 9 of the hybrid circuit 1 is coupled to an analog-to-digital conveter (ADC) 11, which converts the incoming analog signal into a digital signal. The ADC 11 is coupled to the output of the receive amplifier 13, which amplifies the incoming signal to a suitable level for the receiver (not shown). The input of the receive amplifier 13 is coupled to the bridge circuit 8.

The bridge circuit 8 comprises a plurality of impedance components 17, 18, 19 and 20 that are arranged to form a bridge circuit across the terminals of amplifiers 5 and 13, as will be understood by those skilled in the art. Impedance component 20 is the impedance of the secondary side of transformer 21, which couples the subscriber loop 7 to the hybrid circuit 1.

Figure 2:
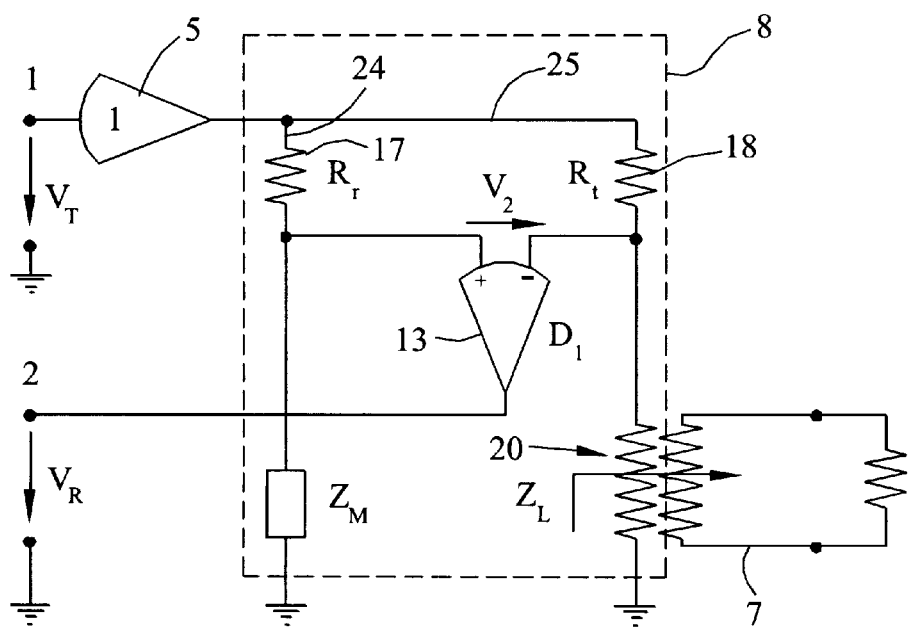
FIG. 2 is a schematic block diagram of the hybrid circuit show in FIG. 1 wherein the DAC and the ADC shown in FIG. 1 have been omitted for purposes of illustration.

Typically, the impedance 17, $Z_r$, and the impedance 18, $Z_t$, of the bridge circuit 8 are resisitive, but may have different resistive values $R_r$ and $R_t$, respectively. This is illustrated in a simplified schematic diagram of the hybrid circuit 1 shown in FIG. 2. For ease of illustration, DAC 4 and ADC 11 have been omitted from FIG. 2. Impedance 19, $Z_M$, should be matched to the input line impedance 20, $Z_L$, so that the transhybrid loss over a specified frequency range is maximized. Therefore, $Z_M$ must provide an appropriate impedance function to match the input line impedance $Z_L$. This impedance matchings function will depend on the subscriber loop 7 in use.

Figure 3:
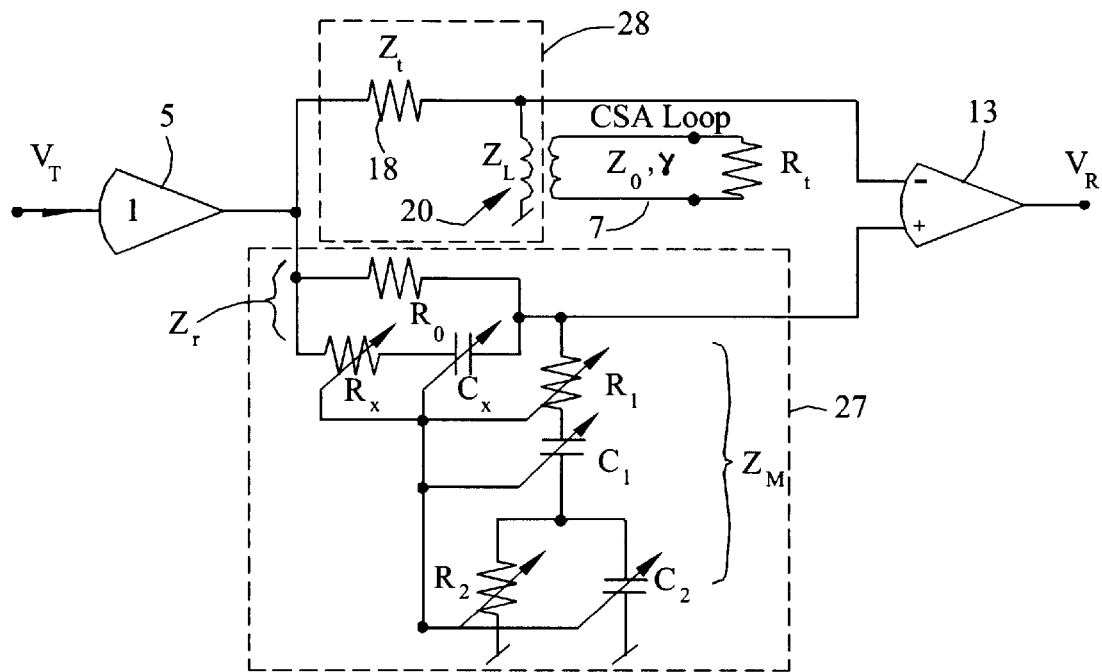
FIG. 3 is a schematic block diagram of a hybrid circuit in accordance with the concepts of the present invention, wherein the impedances $Z_r$ and $Z_M$ shown in FIGS. 1 and 2 have been combined into a third-order RC network having a voltage transfer function H(s), and the impedances $Z_t$ of the bridge circuit and the input line impedance $Z_L$ have been combined into a frequency-dependent voltage divider having a voltage transfer function T(s).

Referring again to FIG. 1, in accordance with the present invention it has been determined that if the two branches 24 and 25 of the bridge circuit 8 are treated as frequency-dependent voltage dividers having transfer functions that are to be matched, the hybrid configuration shown in FIG. 3 is obtained. In FIG. 3, $Z_r$ 17 and $Z_M$ 19 have been combined into a third-order RC network, denoted by the dashed box labeled 27, having a voltage transfer function H(s). Likewise, $Z_t$ 18 and the input line impedance $Z_L$ 20 have been combined into a frequency-dependent voltage divider, denoted by the dashed box labeled 28, having a voltage transfer function T(s). The individual RC components comprising impedances $Z_r$ and $Z_M$ are shown in FIG. 3 for the purpose of illustrating the nature of the third-order RC network 27.

It should be noted that $Z_t$ 18 is resistive and, therefore, is schematically illustrated as a resistor. In accordance with the present invention, it has been determined that the resistors and capacitors of RC network 27, denoted as $R_x$, $C_x$, $R_1$, $C_1$, $R_2$ and $C_2$, should be continuously adjusted to match the impedance of the particular subscriber loop in use. Therefore, the RC components of network 27 are illustrated in FIG. 3 as being variable.

Figure 4:
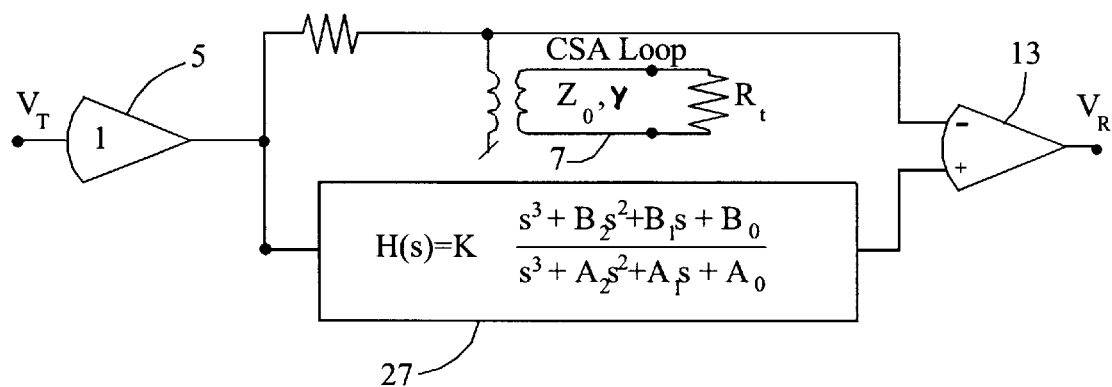
FIG. 4 is a block diagram of the hybrid circuit shown in FIG. 3, wherein the impedances $Z_r$ and $Z_M$ shown in FIG. 3 are illustrated in the form of a third-order transfer function H(s) which, in accordance with the present invention, is to be matched with the transfer function formed by the impedances $Z_t$ of the bridge circuit and the input line impedance $Z_L$.

In accordance with the present invention, it has been determined that a balancing impedance for the network 27 can be obtained by matching the coefficients of the third-order transfer function H(s), in terms of amplitude and phase, i.e., $|H(j\omega)|e^{j\Phi_H(\omega)}$, with the function T(s), i.e. $|T(j\omega)|e^{j\Phi_T(\omega)}$, where H(s) is given as:

$$H(s) = K\frac{s^3 + B_2s^2 + B_1s + B_0}{s^3 + C_2s^2 + C_1s + C_0} \quad (1)$$

and $$T(s) = \frac{Z_L(s)}{R_t + Z_L(s)} \quad (2)$$

where $Z_L(s)$ is the input impedance of a given subscriber line and K is a constant. This is shown in the schematic block diagram of FIG. 4. FIG. 4 illustrates the transfer function H(s) 27, which is a third-order function, as indicated by the powers of the polynomials in the numerator and denominator of H(s). Since the function T(s), which represents the impedance characterisitics of the subscriber loop 7, is known, the function H(s) that matches the function T(s) can be obtained for any subscriber loop, as will be understood by those skilled in the art. Since the transfer function H(s) is a third-order function, H(s) can be expressed as the product of a plurality of lower-order functions. For example, H(s) can be expressed as the product of three first-order functions as follows:

$$H(s) = \prod_{i=1}^{3} KH_i(s) = \left[K_1\frac{s+z_1}{s+p_1}\right]\left[K_2\frac{s+z_2}{s+p_2}\right]\left[K_3\frac{s+z_3}{s+p_3}\right] \quad (3)$$

Figure 5A:
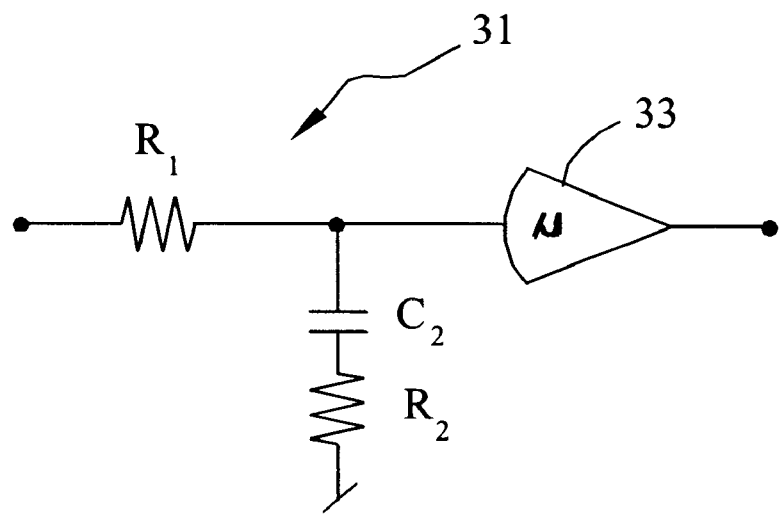
FIG. 5A illustrates a schematic block diagram of a first-order lowpass circuit that may be implemented as one or more of the cascaded circuit modules of the present invention.
Figure 5B:
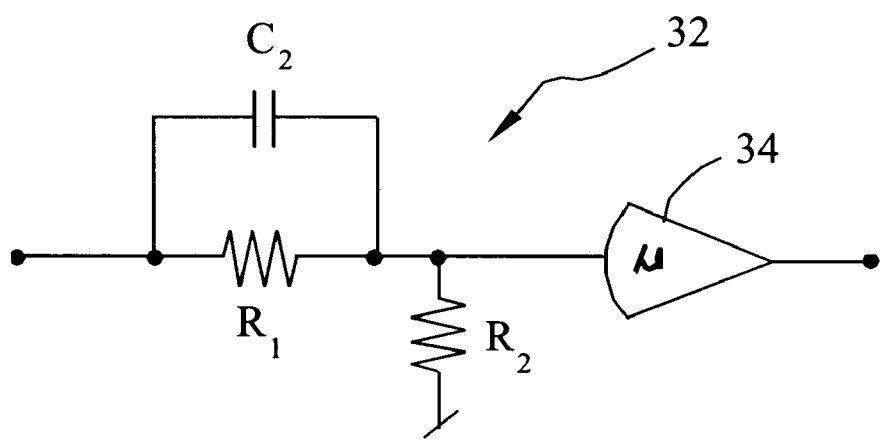
FIG. 5B illustrates a schematic block diagram of a first-order highpass circuit that may be implemented as one or more of the cascaded circuit modules of the present invention.

These first-order functions can be implemented as first-order RC circuit modules and the first-order RC circuits can be cascaded to obtain H(s). FIG. 5A illustrates a schematic block diagram of a first-order lowpass circuit 31 that may be implemented as one or more of the cascaded circuit modules of the present invention. FIG. 5B illustrates a schematic block diagram of a first-order highpass circuit that may be implemented as one or more of the cascaded circuit modules of the present invention. Each of the circuit modules of the present invention preferably comprises either a first-order or a second-order RC circuit. However, it should be noted that the present invention is not limited with respect to the type of circuit comprised in each module or with respect to the dimensions of each module. Each of the circuits 31 and 32 also includes a buffer amplifier 33 and 34, respectively, which are discussed in more detail below.

Figure 6:
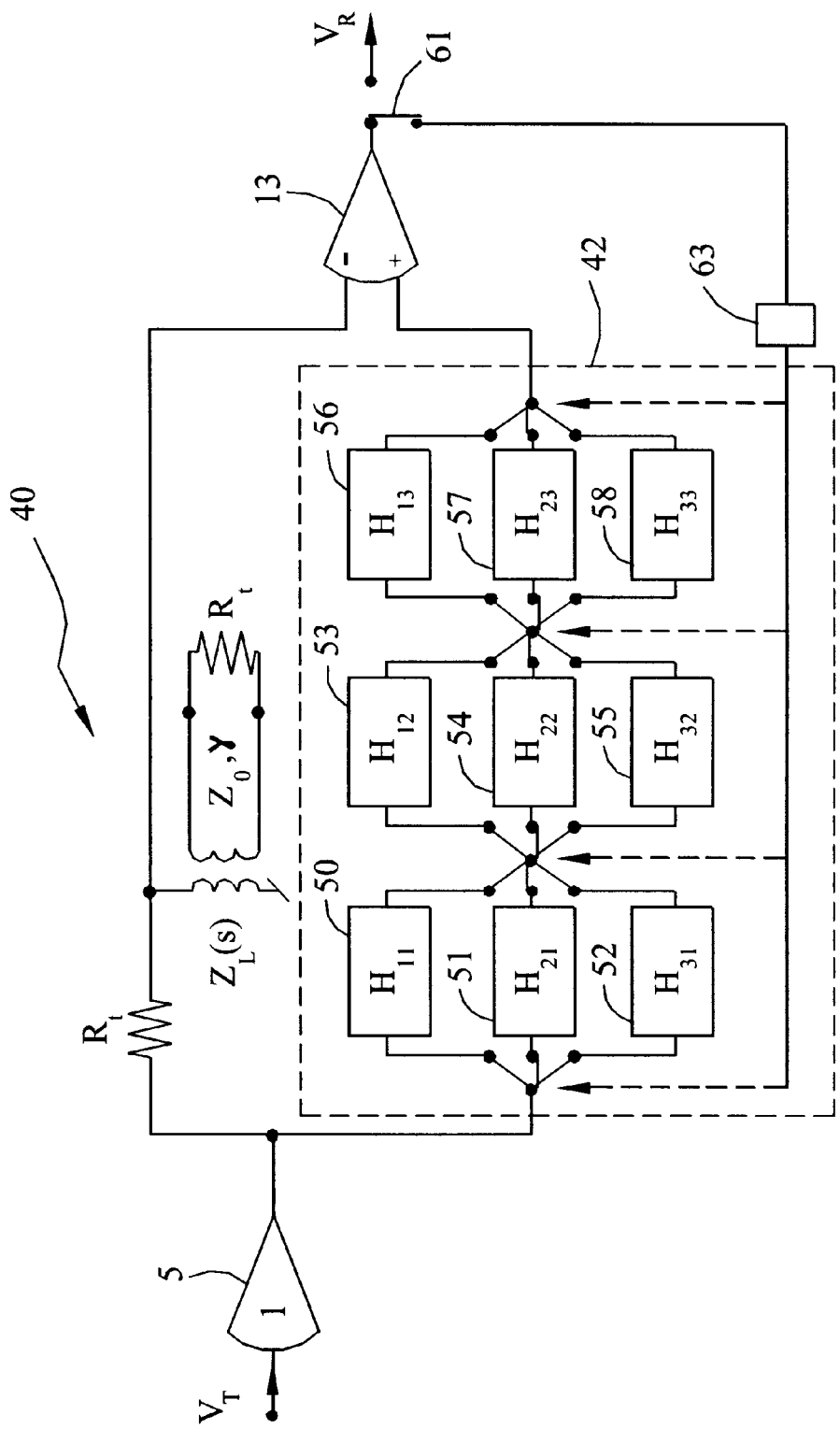
FIG. 6 is a block diagram of the hybrid circuit of the present invention comprising the switched impedance matching network of the present invention, which comprises an array of switchable circuit modules.

FIG. 6 is a block diagram of the hybrid circuit 40 of the present invention, which comprises the switched impedance matching network 42 of the present invention. The impedance matching network 42 comprises an array of switchable circuit modules $H_{11}$–$H_{33}$, which are designated by numerals 50–58. As stated above, each of the circuit modules 50–58 preferably comprises a passive RC circuit, such as that shown in FIGS. 5A and 5B. However, the circuit modules 50–58 may alternatively be comprised of active RC circuits, as will be understood by those skilled in the art. The circuit modules 50–58 contain amplifiers, which are utilized for the purposes of isolating the modules from one another, for providing gain for the signals, and for switching the modules on and off. Although the circuit modules preferably are comprised of first-order RC circuits, it should be noted that higher-order circuits may also be used for this purpose.

During a learning phase, switch 61 is in the position shown in FIG. 6 such that the ouput signal of the impedance matching network 42 is being fed back into a controller 63. The controller 63 determines the transhybrid power loss of the hybrid circuit 40 for various combinations of the circuit modules 50–58 by utilizing this feedback signal. Since the signal being fed back into the controller 63 is an analog signal, the controller 63 preferably comprises an analog-to-digital converter, which converts the analog signal into a digital signal, and a microprocessor, which calculates the transhybrid loss based on the feedback signal and switches the circuit modules 50–58 accordingly. However, it will be apparent to those skilled in the art that logic devices other than a microprocessor can be used for this purpose, such as, for example, a programmable logic array (PLA), a programmable logic controller (PLC), generic array logic (GAL), a microcontroller, etc. The manner in which the controller 63 can be programmed to accomplish the tasks of calculating the transhybrid loss and of switching the circuit modules 50–58 on and off will be understood by those skilled in the art.

Information relating to the best combination of circuit modules 50–58 for a particular subscriber loop is then stored in a memory element (not shown) comprised by the controller 63. This information is then utilized by the controller 63 to select the appropriate combination of modules for each subscriber loop.

The coefficients of the transfer function H(s) are used to calculate the component values for the circuit modules 50–58. The manner in which this is accomplished will be understood by those skilled in the art. Some experimentation will be required to determine the best values for the RC components for each of the circuit modules 50-58, which can be relatively easily accomplished by those skilled in the art. It should be noted that a multitude of different resistor and capacitor values can be used for each of the circuit modules 50–58. Therefore, in the interest of brevity, the many RC circuits that can be designed for this purpose will not be further discussed.

Figure 7:
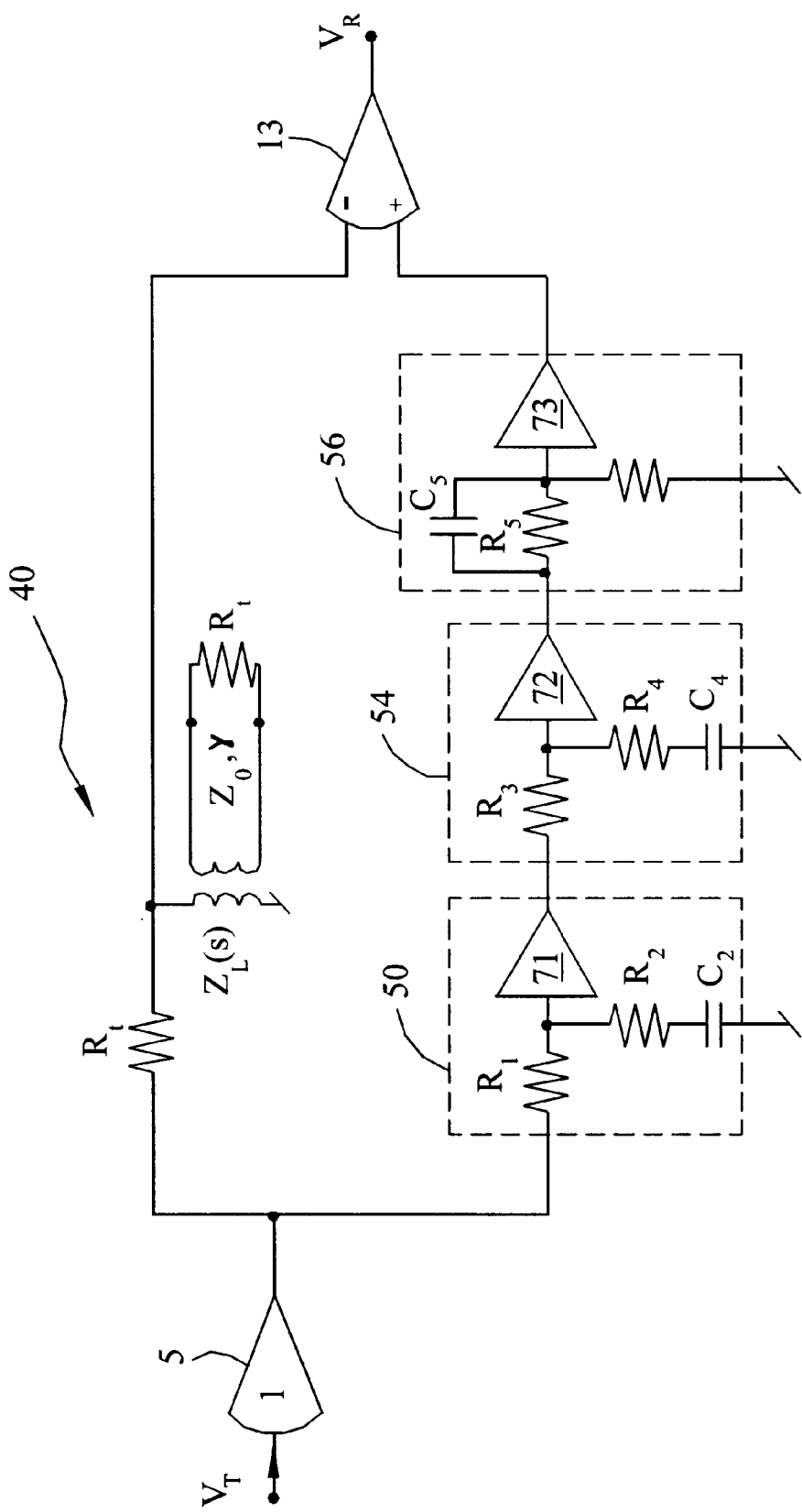
FIG. 7 is a schematic block diagram of the hybrid circuit of the present invention demonstrating three of the circuit modules of the hybrid circuit which are conductively coupled into a cascade by switching on their respective buffer amplifiers.

FIG. 7 is a schematic block diagram of the hybrid circuit 40 of the present invention that demonstrates three of the circuit modules 50, 54 and 56 shown in FIG. 6 that have been conductively coupled into a cascade by switching on their respective buffer amplifiers, 71, 72 and 73. The amplifiers 71, 72 and 73 are switched on by controller 63. For ease of illustration, the controller 63 has been omitted from FIG. 7. FIG. 7 illustrates a lowpass module 50, which is connected to another lowpass module 54, which is connected to a highpass module 56. Through experimentation, it has been determined that this type of lowpass/lowpass/highpass arrangement provides the optimum module combination under most circumstances, i.e., for most subscriber loops. However, it should be noted that the present invention is not limited to a lowpass/lowpass/highpass arrangement. It will be understood by those skilled in the art that other arrangements, such as, for example, a lowpass/highpass/lowpass arrangement or any other arrangement can be used as well. The lowpass/lowpass/highpass configuration is merely the preferred embodiment for the module combination.

The conductive coupling of the circuit modules shown in FIG. 7 may occur either during the learning phase while the controller 63 is determining the best combination of circuit modules 50–58, or after the learning phase once the controller has determined the best combination of circuit modules 50–58. In the latter case, circuit modules 50, 54 and 56 have already been determined by the controller 63 to form the best combination of circuit modules for the subscriber loop in use.

It should be noted that the present invention is not limited to the embodiments discussed above. These embodiments are merely the preferred embodiments of the present invention. The discussion of these embodiments is merely intended to demonstrate the concepts of the present invention and to enable persons skilled in the art to practice the present invention. It will be understood by those skilled in the art that modifications may be made to the embodiments discussed above without departing from the spirit and scope of the present invention.

What is claimed is:

1. A hybrid circuit for performing two-wire-to-four-wire conversion, and vice versa, the hybrid circuit comprising:

a first interface for coupling a transmitter and a receiver to a bridge circuit comprised in the hybrid circuit, the bridge circuit comprising a bridge resistance $R_t$;

a second interface for coupling the bridge circuit of the hybrid circuit to the subscriber loop, the subscriber loop having an input impedance $Z_L$;

an impedance matching network comprised in the bridge circuit, the impedance matching network having a balancing impedance, the impedance matching network comprising a plurality of circuit modules;

a controller comprising logic for switching the circuit modules on and off, wherein the controller switches at least one of the circuit modules on during a period of time, the circuit module switched on during the period of time having a transfer function H(s) that substantially matches a transfer function T(s) of the bridge resistance $R_t$ and of the input impedance of the subscriber loop $Z_L$, whereby the balancing impedance of the matching network substantially matches the impedance of the subscriber loop.

2. The hybrid circuit of claim 1, wherein the controller switches at least two of the circuit modules on during the period of time to form a cascade circuit, the cascade circuit having a a transfer function H(s) that substantially matches the transfer function T(s), whereby the balancing impedance of the matching network substantially matching the impedance of the subscriber loop.

3. The hybrid circuit of claim 1, wherein the controller varies the gain of the circuit module that is switched on during the period of time to provide the circuit module with the balancing impedance that substantially matches the impedance of the subscriber loop.

4. The hybrid circuit of claim 2, wherein the controller varies the gain of at least one of said at least two of the circuit modules to provide the cascade circuit with a balancing impedance that substantially matches the impedance of the subscriber loop.

5. The hybrid circuit of claim 2, wherein the controller determines which of the circuit modules, when switched on, will form a cascade circuit having a balancing impedance that most closely matches the impedance of the subscriber loop, wherein the controller switches on the circuit modules determined to form the cascade circuit having a balancing impedance that most closely matches the impedance of the subscriber loop.

6. The hybrid circuit of claim 5, wherein the controller comprises a microprocessor.

7. The hybrid circuit of claim 5, wherein each module circuit comprises a buffer amplifier that isolates the respective module circuit from the other module circuits, wherein the controller switches on a particular module circuit by switching on the buffer amplifier of the particular module circuit.

8. The hybrid circuit of claim 7, wherein the cascade circuit comprises a lowpass circuit coupled to a highpass circuit.

9. The hybrid circuit of claim 8, wherein the controller switches at least three of the circuit modules on during a time interval to form the cascade circuit, wherein the cascade circuit formed of three circuit modules comprises a first lowpass circuit coupled to a second lowpass circuit coupled to a highpass circuit.

10. The hybrid circuit of claim 9, wherein each of the circuit modules comprises a first-order circuit.

11. The hybrid circuit of claim 10, wherein the hybrid circuit is comprised in data communicaitions equipment located at the central office.

12. A hybrid circuit for performing two-wire-to-four-wire conversion, and vice versa, the hybrid circuit comprising:

means for coupling a transmitter and a receiver to a bridge circuit comprised in the hybrid circuit, means for coupling the bridge circuit of the hybrid circuit to the subscriber loop, the subscriber loop having an impedance;

an impedance matching network comprised in the bridge circuit, the impedance matching network comprising a plurality of circuit modules, each circuit module having a predetermined impedance;

means for switching the circuit modules on and off, wherein said means for switching the circuit modules on and off switches at least two of the circuit modules on during a period of time to form a cascade circuit, whereby the impedance matching network is provided with a balancing impedance, the balancing impedance substantially matching the impedance of the subscriber loop.

13. The hybrid circuit of claim 12, wherein prior to switching on any of the circuit modules, the means for switching the circuit modules on and off determines which of the circuit modules, when switched on, will form a cascade circuit which provides the impedance matching network with a balancing impedance that most closely matches the impedance of the subscriber loop, wherein once the means for switching the circuit modules on and off has made the determination, it switches on the circuit modules determined to form the cascade circuit which provides the impedance matching network with the balancing impedance that most closely matches the impedance of the subscriber loop.

14. The hybrid circuit of claim 13, wherein the means for switching the circuit modules off and on comprises a microprocessor.

15. The hybrid circuit of claim 14, wherein each circuit module comprises a buffer amplifier that isolates the respective circuit module from the other circuit modules, wherein the means for switching the circuit modules off and on switches a particular module circuit on by biasing the buffer amplifier of the particular circuit module.

16. The hybrid circuit of claim 15, wherein the cascade circuit comprises a lowpass circuit coupled to a highpass circuit.

17. The hybrid circuit of claim 16, wherein the means for switching the module circuits off and on switches at least three of the circuit modules on during a period of time to form the cascade circuit, wherein the cascade circuit formed of three circuit modules comprises a first lowpass circuit coupled to a second lowpass circuit coupled to a highpass circuit.

18. The hybrid circuit of claim 17, wherein each of the circuit modules comprises a first-order circuit.

19. A method for setting a balancing impedance for a hybrid circuit, the hybrid circuit connecting a subscriber loop to a central office, the bridge circuit comprising a bridge resistance $R_t$, the balancing impedance substantially matching an input impedance $Z_L$ of the subscriber loop, the method comprising the steps of:

switching on different combinations of circuit modules comprised in an impedance matching network of the hybrid circuit to alter the impedance of the impedance matching network, wherein the combination of circuit modules switched on at any given instant in time has a transfer function $H(s)$;

measuring a transhybrid power loss of the hybrid circuit for each combination of circuit modules that have been switched on;

selecting the combination of circuit modules that result in the maximum transhybrid power loss and thus the minimum near-end echo; and switching on the selected combination of circuit modules to form a cascade circuit having a transfer function $H(s)$ that substantially matches a transfer function $T(s)$ formed by the bridge resistance $R_t$ and by the input impedance $Z_L$ of the subscriber loop.

20. The method of claim 19, wherein each combination of circuit modules switched on at any given instant in time comprises at least three circuit modules, each circuit module comprising a buffer amplifier that isolates the circuit modules from one another, wherein the circuit modules are switched on by biasing on their respective buffer amplifiers.

21. The method of claim 20, wherein the three circuit modules comprising the combination of circuit modules correspond, respectively, to a first lowpass circuit module coupled to a second lowpass circuit module coupled to a highpass circuit module.

22. The method of claim 21, wherein said steps of switching on different combinations of circuit modules, of measuring the transhybrid loss, and of selecting the combination of circuit modules occur during a learning phase and are performed for a plurality of subscriber loops, and wherein the step of switching on the selected combination of circuit modules occurs after the learning phase.

23. The method of claim 22, wherein each circuit module is a first-order circuit.

24. The method of claim 23, wherein each selected combination of circuit modules has an overall gain, and wherein any selected combination of circuit modules is utilized with at least two subscriber loops, wherein the overall gain of the selected combination is adjusted for each of the two subscriber loops such that the selected combination has a different gain for each of the two subscriber loops.

* * * * *